United States Patent
Woollen (10) Patent No.: US 7,730,112 B2
(45) Date of Patent: Jun. 1, 2010

(54) SCOPED APPLICATIONS

(75) Inventor: Rob Woollen, San Francisco, CA (US)

(73) Assignee: BEA Systems Inc., Redwood Shores, CA (US)

( * ) Notice: Subject to any disclaimer, the term of this patent is extended or adjusted under 35 U.S.C. 154(b) by 368 days.

(21) Appl. No.: 10/962,133

(22) Filed: Oct. 8, 2004

(65) Prior Publication Data

US 2005/0251507 A1 Nov. 10, 2005

Related U.S. Application Data

(60) Provisional application No. 60/569,597, filed on May 10, 2004.

(51) Int. Cl.
*G06F 7/00* (2006.01)
(52) U.S. Cl. ................. 707/805; 709/220
(58) Field of Classification Search ........ 707/102, 707/3, 1; 709/201
See application file for complete search history.

(56) References Cited

U.S. PATENT DOCUMENTS

| | | | |
|---|---|---|---|
| 5,835,777 A | 11/1998 | Staelin | |
| 5,911,071 A * | 6/1999 | Jordan | 717/108 |
| 6,128,647 A * | 10/2000 | Haury | 709/207 |
| 6,529,992 B1 * | 3/2003 | Thomas et al. | 711/1 |
| 6,721,777 B1 | 4/2004 | Sharma | |
| 6,751,797 B1 | 6/2004 | Desgranges et al. | 719/315 |
| 6,766,324 B2 | 7/2004 | Carlson et al. | 707/10 |
| 6,829,575 B2 | 12/2004 | Freund et al. | 707/10 |
| 6,892,382 B1 | 5/2005 | Hapner et al. | 717/174 |
| 6,970,924 B1 | 11/2005 | Chu et al. | |
| 6,976,061 B1 | 12/2005 | Sharma | |
| 7,069,553 B2 | 6/2006 | Narayanaswamy et al. | |
| 7,086,065 B1 | 8/2006 | Yeluripati et al. | 719/311 |
| 7,107,592 B2 | 9/2006 | Taylor et al. | 718/104 |
| 7,127,713 B2 | 10/2006 | Davis et al. | |
| 7,185,071 B2 | 2/2007 | Berg et al. | |
| 7,228,541 B2 | 6/2007 | Gupton et al. | |
| 7,246,104 B2 | 7/2007 | Stickler | |
| 7,302,609 B2 | 11/2007 | Matena et al. | |
| 2002/0049744 A1 * | 4/2002 | Nakos et al. | 707/1 |
| 2002/0078132 A1 * | 6/2002 | Cullen et al. | 709/201 |
| 2002/0178439 A1 | 11/2002 | Rich et al. | |
| 2003/0005093 A1 * | 1/2003 | Deboer et al. | 709/220 |
| 2003/0093717 A1 | 5/2003 | Mason | |
| 2003/0101435 A1 | 5/2003 | Takahashi | |
| 2003/0158919 A1 | 8/2003 | Fomenko | |
| 2003/0204784 A1 | 10/2003 | Jorapur | |
| 2003/0212990 A1 | 11/2003 | Brodkorb et al. | |

(Continued)

OTHER PUBLICATIONS

Chappell, Dave, Richard Monson-Haefel, Java Message Service, O'Reilly, Dec. 2000.*

(Continued)

*Primary Examiner*—Charles Rones
*Assistant Examiner*—Dinku W Gebresenbet
(74) *Attorney, Agent, or Firm*—Fliesler Meyer LLP (57) ABSTRACT

Scoped applications are configured as self-contained units that do not require external configuration of messaging or database access settings. The applications can be deployed to multiple and disparate environments and utilized without the need for additional server configuration by an administrator. The applications include metadata indicating information specific to a particular server that can be provided at deployment.

16 Claims, 6 Drawing Sheets

U.S. PATENT DOCUMENTS

| | | |
|---|---|---|
| 2004/0068537 A1 | 4/2004 | Freund et al. |
| 2004/0068553 A1 | 4/2004 | Davis et al. |
| 2004/0068731 A1 | 4/2004 | Davis et al. |
| 2004/0088681 A1 | 5/2004 | Berg et al. |
| 2004/0172407 A1 | 9/2004 | Arpirez Vega |
| 2004/0255294 A1 | 12/2004 | Spotwood |
| 2005/0005200 A1 | 1/2005 | Matena et al. |
| 2005/0033767 A1 | 2/2005 | Kamentz |
| 2005/0137856 A1 | 6/2005 | Cencini et al. |
| 2005/0138076 A1 | 6/2005 | Seo et al. |

OTHER PUBLICATIONS

Taylor, Art, J2EE and Beyond: Design, Develop, and Deploy World-Class Java Software, Prentice Hall, Dec. 23, 2002.*

Chappell, Dave; Richard Monson-Haefel, Java Message Service, O'Reilly, Dec. 2000.*

Taylor, Art; J2EE and Beyond:Design, Develop, and Deploy World-Class Java Software, Prentice Hall, Dec. 23, 2002.*

Guo, et al., "Developing a Distributed Scalable Java Component Server", Future Generation Computer Systems, May 24, 2001, vol. 17, Issue 8, pp. 1051-1057, © 2001 Elsevier Science B.V.

Vecellio, G. et al., "Container Services for High Confidence Software", Seventh International Workshop on Component-Oriented Programming, Jun. 10-14, 2002, 9 pages.

"Microsoft Computer Dictionary: Fifth Edition", Copyright © 2002 by Microsoft Corporation, pp. 115, 176, and 542.

Hess, et al. "An Adaptive Data Object Service for Pervasive Computing Environments", Dec. 4, 2000, 27 pages.

Sun Microsystems Enterprise JavaBeans Specification, Version 2.1, Final Release, Sun Microsystems, Inc., Nov. 12, 2003, 646 pages.

Menci et al., "Enhancing EJB Component Model," Academy of Sciences of the Czech Republic, 2002, 11 pages.

Popovici et al., "Spontaneous Container Services," ECOOP 2003, LNCS 2743, 2003, pp. 29-54.

* cited by examiner

Prior Art

SCOPED APPLICATIONS

PRIORITY CLAIM

The present application is a nonprovisional of U.S. Patent Application No. 60/569,597, filed on May 10, 2004, entitled SCOPED APPLICATIONS, Inventor: Rob Woolen, the contents of which are incorporated by reference in their entirety.

RELATED APPLICATION

The present application relates to U.S. Patent Application No. 60/570,953, filed on May 13, 2004, entitled SYSTEM AND METHOD FOR CUSTOM MODULE CREATION AND DEPLOYMENT, Inventor: Rob Woolen, the contents of which are incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present patent application relates generally to the configuration and deployment of applications in the Java programming language and more specifically to the construction and deployment of scoped applications.

BACKGROUND OF THE INVENTION

Since its inception in 1995, the Java programming language has become increasingly popular. Java, which is an interpreted language, enabled the creation of applications which could be run on a wide variety of platforms. This ability to function across a variety of different client platforms and Java's relatively easy implementation of network applications has resulted in its use in endeavors as basic as personal webpages to endeavors as complex as large business-to-business enterprise systems.

As Java has become more commonplace, a wide variety of tools and development platforms have been created to assist developers in the creation and implementation of Java applications. These development platforms have usually been built around an application server program which provides a common interface for accessing internal data and resources.

However, as these servers and their associated applications have become more complex and developed there has been a corresponding need to properly configure resources so that they can be accessed by the applications. Often, features such as Java Database Binding Connectivity (JDBC), which governs application access to internal data sources and Java Messaging System (JMS), which controls messaging among and between applications must be separately configured on the server before the application can be deployed. This greatly complicates the process of deploying applications on new servers.

Figure 1:
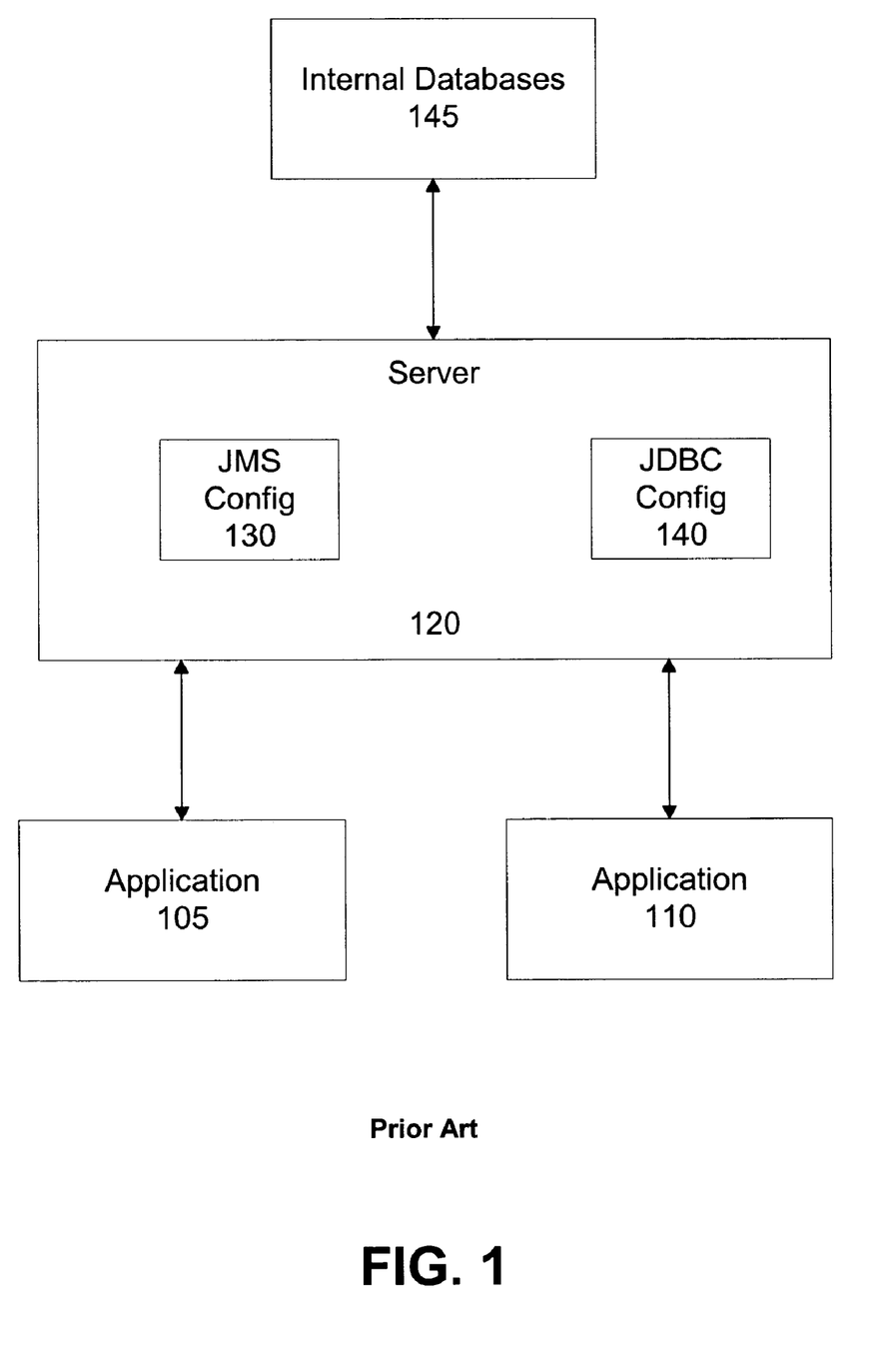
FIG. 1 illustrates an embodiment of an application environment as practiced in the prior art.

FIG. 1 illustrates an embodiment of an application environment as practiced in the prior art. A server 120 supports multiple java applications 105, 110, and coordinates access to an internal database 145. The server 120 performs platform functions such as resource management, messaging, load balancing, and access to data sources. The server includes a deployment mechanism that deploys the applications 105, 110 from stored archive files.

The internal databases 145 are information sources that are accessed and utilized by the server 120. In one embodiment, the internal databases 145 are Structured Query Language (SQL) compliant databases. The server 120 receives requests for data from the applications 105, 110, translates the data requests to SQL requests, and then passes the requested data back to the applications.

The applications 105, 110 are groups of modules that have been assembled into application units for use on the server 120. The applications are configured to provide interaction with remote entities and to provide a mechanism by which the server interacts with clients and other servers.

The server 120 includes JMS configuration 130. The JMS configuration sets the parameters through which messaging is performed between and among the different applications 105, 110. The JMS configuration 130 includes information such as a store indicating where persistent JMS data is stored, a paging store indicating where non-persistent JMS data is stored, a template for any queues or topics for the server, and any other configuration information that is necessary to implement messaging operations within and among the applications 105, 110. In one embodiment, the JMS configuration 130 is set by a system administrator and must be properly configured before the applications 105, 110 can utilize messaging.

The server 120 also includes JDBC 140 configuration. The JDBC configuration includes connection pool characteristics, driver information, tracking information, and information about the types and sources of data, such as the internal databases 145, that are accessed. In one embodiment, the JDBC configuration 140 is set by a system administrator and must be properly configured before the applications 105, 110 can access the internal databases 145. This process can be especially time consuming and difficult, significantly adding to the cost of deploying applications.

What is needed is a method of creating applications that can utilize messaging and database functions without the need for additional server configuration.

DETAILED DESCRIPTION

Scoped applications are configured as self-contained units that do not require external configuration of messaging or database access settings. The applications can be deployed to multiple and disparate environments and utilized without the need for additional server configuration by an administrator. The applications include metadata indicating information specific to a particular server that can be provided at deployment.

Figure 2:
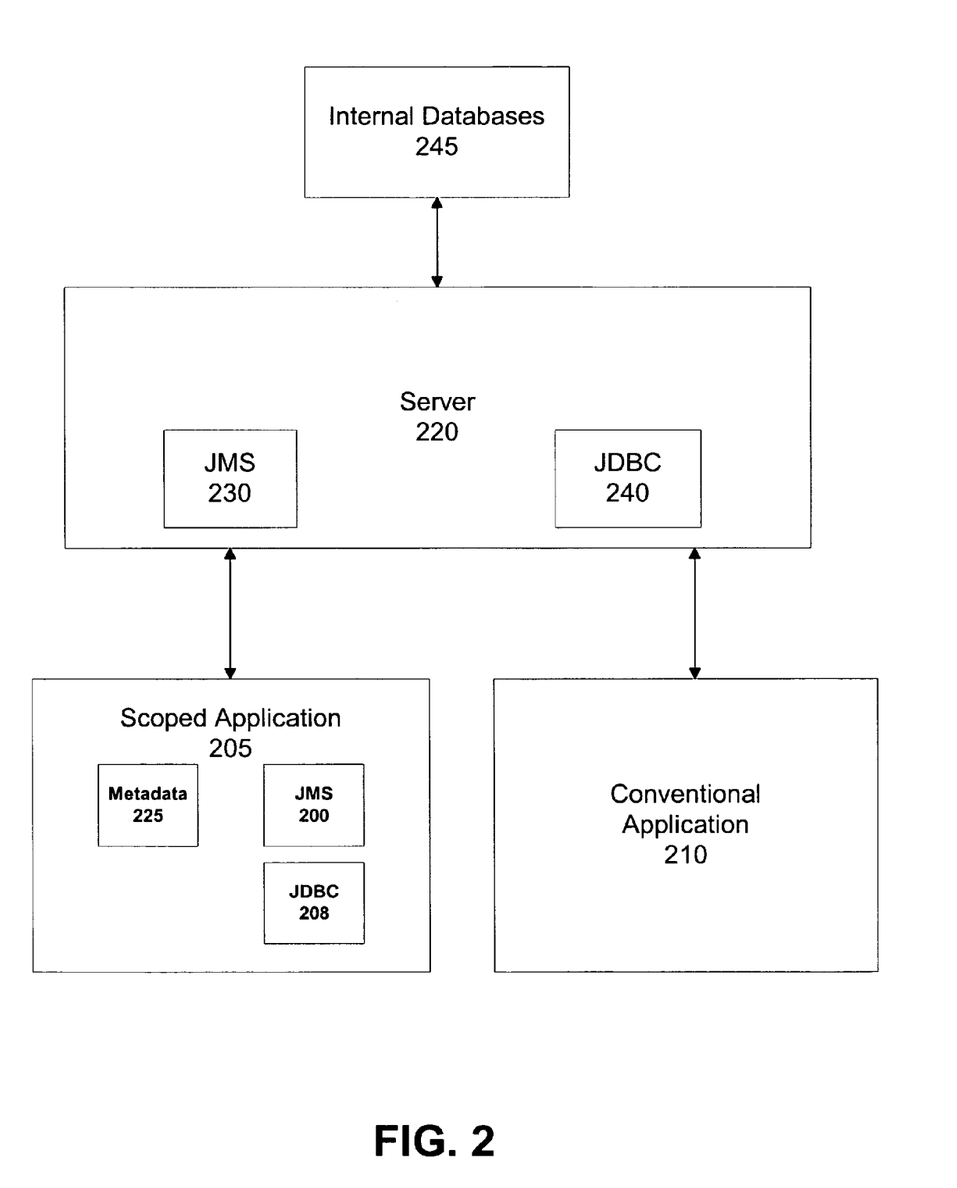
FIG. 2 illustrates an embodiment of an application environment in accordance with one embodiment of the present invention.

FIG. 2 illustrates an embodiment of an application environment in accordance with one embodiment of the present invention. A server 220 supports a scoped application 205 and a conventional application 210 and coordinates access to an internal database 245. The server 220 performs platform functions such as resource management, messaging, load balancing, and access to data sources. The server includes a deployment mechanism that deploys the applications 205, 210 from stored archive files.

The internal databases are information sources that are accessed and utilized by the server 220. In one embodiment, the internal databases 245 are Structured Query Language (SQL) compliant databases. The server 120 receives requests for data from the applications 205, 210, translates the data requests to SQL requests, and then passes the requested data back to the applications.

The scoped application 205 and conventional application 210 are groups of modules that have been assembled into application units for use on the server 220. The applications are configured to provide interaction with remote entities and to provide a mechanism by which the server interacts with clients and other servers.

The scoped application additionally includes specific configuration information that enables it to be easily deployed to multiple environments that is stored in the metadata 225. In addition to information stored in conventional applications such as deployment descriptors which identify the application and its relevant characteristics, the metadata 225 also identifies information specific to the server 220 that should be provided by an administrator before deployment of the application.

The scoped application 205 also include JMS configuration information 200. The JMS configuration 200 information sets the parameters through which each application so configured communicates within itself and with other applications. In one embodiment, the JMS configuration 200 can only be used for messaging when the consumers and providers of the messages are internal to the application. In alternate embodiments, the internal JMS configuration 200 can be used for communication with other applications. The JMS configuration 200 includes some information that is server-specific and is provided by an administrator during deployment. The information that can be configured by the administrator is identified in the metadata 225.

The scoped application 205 also includes JDBC configuration 208. The JDBC configuration 208 includes connection pool characteristics, driver information, tracking information, and information about the types and sources of data, such as the internal databases 245, that are accessed by the scoped application. The JDBC configuration 200 includes some information that is server-specific and is provided by an administrator during deployment. The information that can be configured by the administrator is identified in the metadata 225.

The server 220 includes JMS configuration 230. The JMS configuration sets the parameters through which messaging is performed for the conventional application 210. The server 220 also includes JDBC 240 configuration. The JDBC configuration includes connection pool characteristics, driver information, tracking information, and information about the types and sources of data, such as the internal databases 245 that are accessed by the conventional application.

Figure 3:
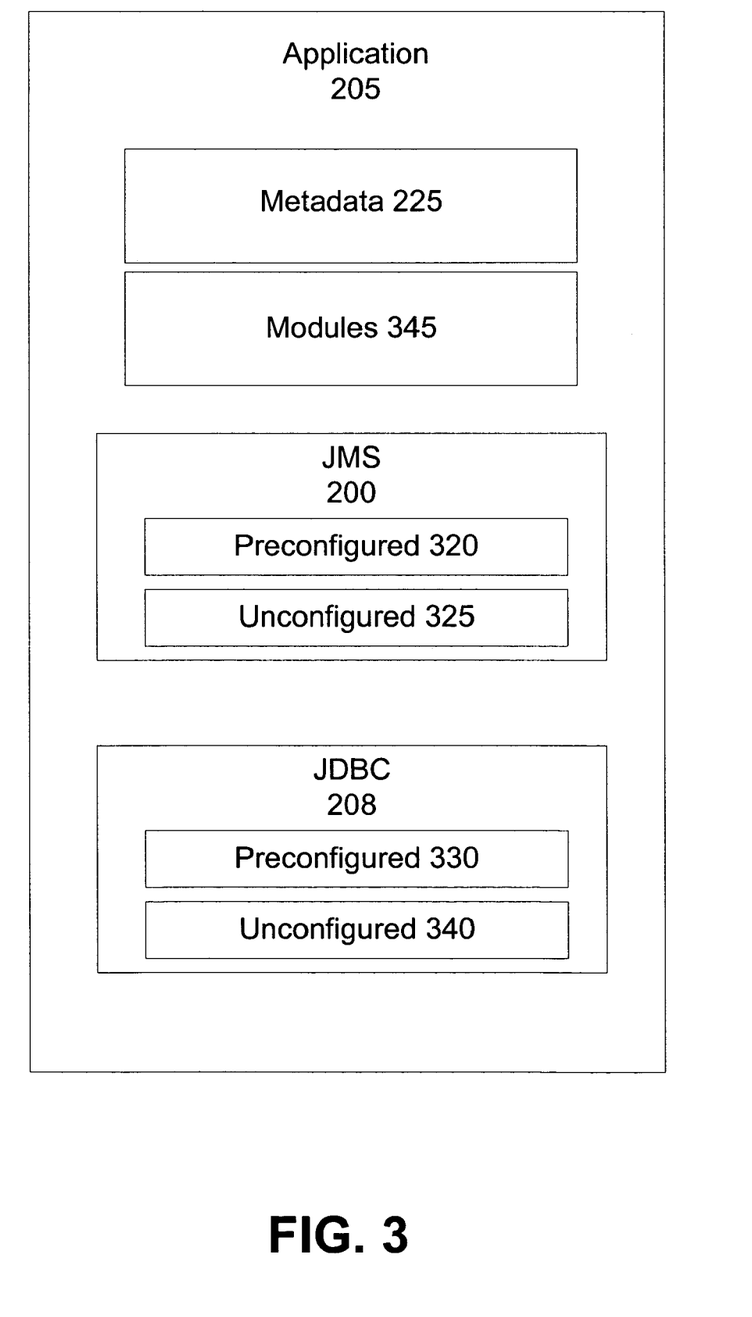
FIG. 3 illustrates a closer view of a scoped application.

FIG. 3 illustrates a closer view of the scoped application 205. The scoped application 205 includes metadata 225, modules 345, JMS configuration 200, and JDBC configuration 208.

The metadata 225 includes information which identifies and characterizes the application for a deployment system and indicates how the application should be deployed and recognized after deployment. The metadata 225 includes a deployment descriptor identifying the application, the modules within the application, and any special or distinct characteristics of the application. The deployment descriptor can be an application.xml and/or a web-application.xml file.

The metadata additionally identifies any unconfigured JMS 325 or JDBC 340 parameters that should be configured by an administrator during deployment. In one embodiment, the metadata includes tags that are detected by a deployment tool during the deployment process that causes the tool to prompt an administrator for values for the parameters. In an alternate embodiment, the deployment tool can be configured to automatically provide configuration for the unconfigured parameters upon detecting reference to them in the metadata 225.

The scoped application additionally includes modules 345. The modules 345 are program units that provide the functionality for the application. The modules 345 can be common modules such as libraries, administrative web applications, Enterprise Java Beans (EJB's) or any other modules that might be made available for use in multiple applications. The modules can also include specific modules that are created specifically for the scoped application 205.

The scoped application also includes JDBC configuration 208, which defines the manner in which the scoped application 205 accesses internal data sources. The JDBC configuration includes preconfigured 330 and unconfigured 340 parameters. The preconfigured parameters are parameters that are not specific to a particular server and can include a preferred driver or data management preferences. The unconfigured parameters are parameters that are specific to a particular server and can include a DataSource or any specific characteristics of data stored on the server 220.

The scoped application also includes the JMS configuration 200. The JMS configuration includes preconfigured 320 and unconfigured 325 parameters. The preconfigured parameters are parameters that are not specific to a particular server and can include a store indicating where persistent JMS data is stored, a paging store indicating where non-persistent JMS data is stored, a template for any queues or topics for the server, and any other configuration information that is necessary to implement messaging operations. The unconfigured parameters are parameters tied to a specific server and can also include any of the previously mentioned criteria. In one embodiment, the preconfigured parameters 208 govern how the application 205 conducts internal messaging and the unconfigured parameters govern how the application conducts messaging with other applications.

Figure 4:
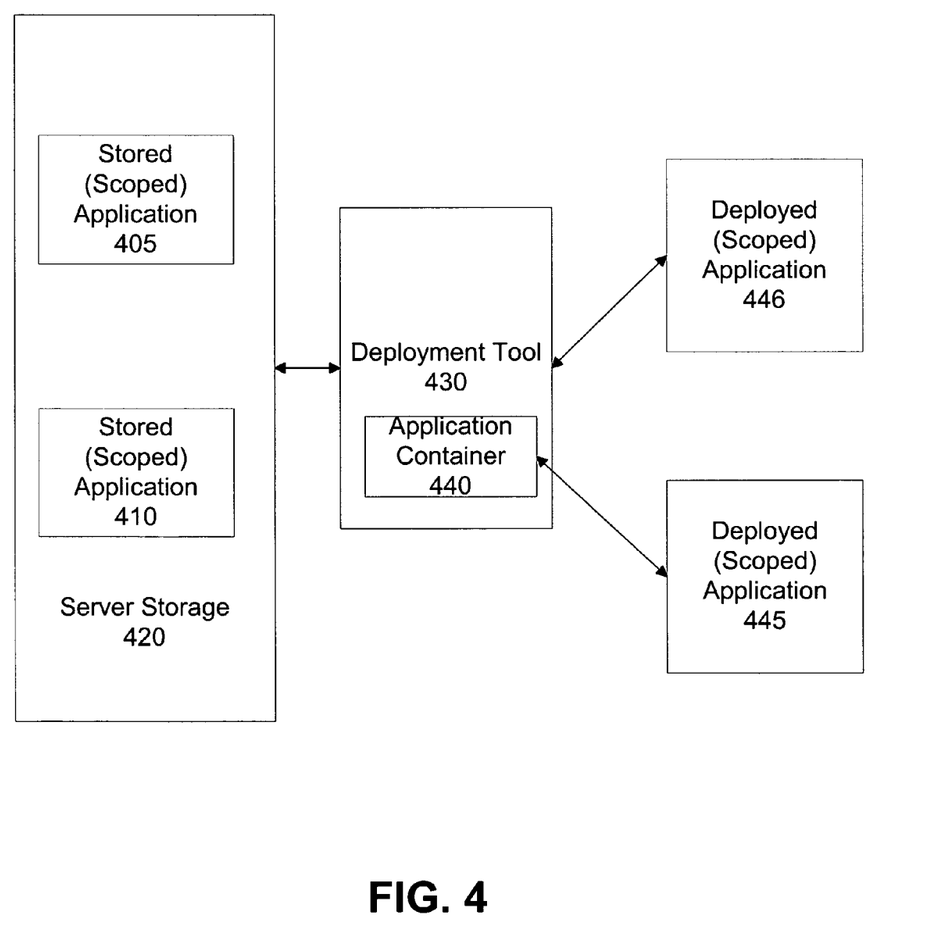
FIG. 4 illustrates an application deployment environment in accordance with one embodiment of the present invention.

FIG. 4 illustrates an application deployment environment in accordance with one embodiment of the present invention. A server storage 420 stores multiple stored applications 405, 410 previous to deployment. The applications are preferably stored as archives for deployment by a deployment tool 430 and are scoped applications of the kind discussed with respect to FIG. 2 and FIG. 3. In one embodiment, the applications are stored in the form of Enterprise ARchive (EAR) files. The stored applications 405, 410 include modules containing the functionality of the applications and deployment descriptors that indicate to the deployment tool 430 how the applications 405, 410 should be deployed.

The deployment tool 430 is responsible for deploying the stored applications 405, 410 from the server storage to generate the deployed applications 445, 446. In one embodiment, the deployment tool runs when the server is started and automatically deploys a group of preselected applications. In an alternate embodiment, the deployment tool allows a system administrator to manually select which applications are deployed. The deployment tool checks the deployment descriptors of each of the stored applications 405, 410 to locate the modules used by the application within that application's EAR file and to deploy the application. The deployed applications are then available for use by remote clients or any party interacting with the server.

The deployment tool 430 also checks the deployment descriptors for any references to unconfigured parameters that require server-specific configuration. In one embodiment, the deployment descriptors include special tags that, when detected by the deployment tool, prompt an administrator to define the value of the parameter. In an alternate embodiment, the deployment tool 430 can be configured to provide preset values for certain parameters. For example, the deployment tool 430 could be configured with a DataSource value that it provides upon detecting an unconfigured DataSource parameter in a deployment descriptor. The deployment tool 430 could then configure the application with the preconfigured value and deploy the application 445 so configured.

In some embodiments, the deployment tool includes an application container 440. The application container 440 serves as an intermediary layer between a deployment subsystem of the deployment tool 430 and the conventional containers. The application container performs application classloading, JNDI, file management, and parsing of deployment descriptors.

Figure 5:
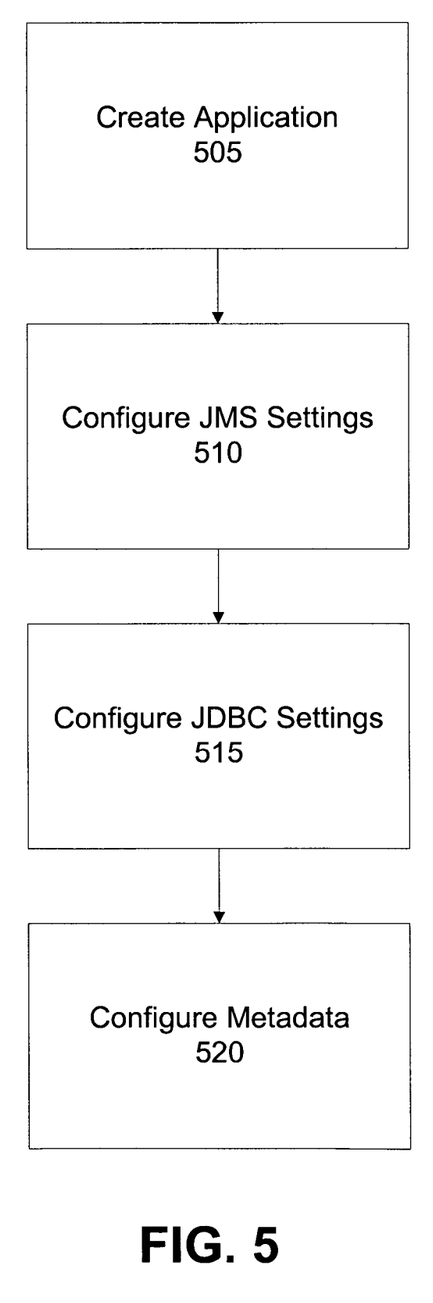
FIG. 5 illustrates one embodiment of a process for configuring a scoped application.

FIG. 5 illustrates one embodiment of a process for configuring a scoped application. The process begins with the creation of an application. The application can be created from a combination of modules that have been created by the developer and general purpose modules that perform common functions. In one embodiment, the application performs both messaging and database access.

The JMS settings for the application are configured in step 510. The JMS settings can include a store indicating where persistent JMS data is stored, a paging store indicating where non-persistent JMS data is stored, a template for any queues or topics for the server, and any other configuration information that is necessary to implement messaging operations within the application itself and with other applications.

In step 515, the JDBC settings are configured. The JDBC settings include a preferred driver, which may be included in the application, data pooling and management preferences, and any other settings relevant for database access.

In step 520 the metadata is configured. The metadata includes the deployment descriptor. During this step, any information that is server specific is identified for recognition by a deployment tool. In one embodiment, the metadata includes tags that, when processed by a deployment tool, prompt an administrator during deployment to provide certain values for unconfigured JDBC and JMS parameters.

Figure 6:
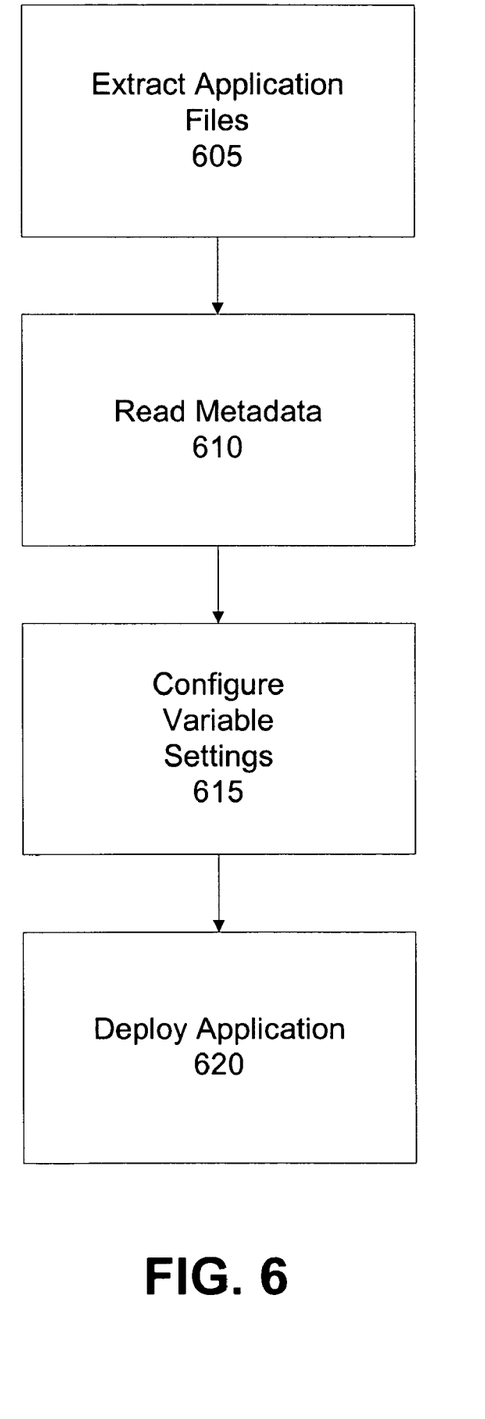
FIG. 6 illustrates one embodiment of a process for deploying a scoped application.

FIG. 6 illustrates one embodiment of a process for deploying a scoped application. In step 605, a deployment tool extracts the application files from a server storage. In one embodiment, the applications are stored as EAR files. The deployment tool then reads the metadata of the application. In one embodiment the metadata is stored in application.xml and web-application.xml deployment descriptors.

The deployment descriptors include flags identifying JMS and JDBC parameters that require server specific values. In one embodiment, upon detecting the flags, the deployment tool prompts an administrator to provide values for the parameters. In an alternate embodiment the deployment tool can be configured with preset values for certain configurable parameters and automatically provide the values when the flags are detected.

In step 620, the deployment tool deploys the application. The application is, at this point usable by outside parties interacting with the server. Messaging and database access activities performed by the application are performed according to the application's internal JMS and JDBC settings rather than the configuration files provided by the server. In one embodiment, the application can be configured to use the server's JMS and JDBC settings if they are configured and to use its own internal settings if the server JMS and JDBC settings are unconfigured.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

What is claimed:

1. A computer implemented method for configuring a scoped application, the method comprising:
creating a scoped application configured to be deployed into different server environments, wherein the scoped application includes
a Java Messaging Service (JMS) consumer and a JMS producer,
a plurality of application modules that execute on a server,
metadata that identifies which of a plurality of application parameters are specific to different server environments,
a messaging configuration that sets the parameters through which each scoped application communicates, wherein the parameters are configured to assist messaging between the JMS consumer and a second JMS producer in a second application, and wherein the parameters are further configured to assist messaging between the JMS producer and a second JMS consumer in the second application,
a data access configuration that sets the parameters defining types and sources of data that are accessed by the scoped application,
wherein each of the messaging and data access configurations include
preconfigured messaging parameters, as identified by the metadata, which are generic to all of the different server environments, and which govern how the scoped application conducts internal messaging, and
unconfigured messaging parameters, as identified by the metadata, which are specific to each of the different server environments, and which govern how the scoped application conducts messaging between a plurality of applications executing on the server; and
deploying the scoped application as an application instance into a particular server environment, using a deployment tool, wherein during deployment of the scoped application to the particular server environment, the deployment tool
determines, using the metadata, which of the plurality of application parameters are specific to the particular server environment,
prompts for, or retrieves server-specific values for the unconfigured parameters, and
if server-specific values are available, then configures the messaging and data access configurations with the provided values, or
if server-specific values are not available, then configures the messaging and data access configurations with default values, and
deploys the scoped application, as configured, into the particular server environment without additional server configuration.

2. The method of claim 1, wherein the parameters include a store, the store indicating a location for persistent data.

3. The method of claim 1, wherein the parameters include a paging store, the paging store indicating a location for non-persistent data.

4. The method of claim 1, wherein the parameters include a template for a messaging queue.

5. The method of claim 1, further comprising storing in metadata of the application an entry associated with the parameter, the entry configured to identify the parameter for an administrator.

6. A computer readable storage medium storing one or more sequences of instructions for configuring a scoped application, wherein said instructions, when executed by one or more processors, cause the one or more processors to execute the steps of:
creating a scoped application configured to be deployed into different server environments, wherein the scoped application includes
a Java Messaging Service (JMS) consumer and a JMS producer,
a plurality of application modules that execute on a server,
metadata that identifies which of a plurality of application parameters are specific to different server environments,
a messaging configuration that sets the parameters through which each scoped application communicates, wherein the parameters are configured to assist messaging between the JMS consumer and a second JMS producer in a second application, and wherein the parameters are further configured to assist messaging between the JMS producer and a second JMS consumer in the second application,
a data access configuration that sets the parameters defining types and sources of data that are accessed by the scoped application,
wherein each of the messaging and data access configurations include
preconfigured messaging parameters, as identified by the metadata, which are generic to all of the different server environments, and which govern how the scoped application conducts internal messaging, and
unconfigured messaging parameters, as identified by the metadata, which are specific to each of the different server environments, and which govern how the scoped application conducts messaging between a plurality of applications executing on the server; and
deploy the scoped application as an application instance into a particular server environment, using a deployment tool, wherein during deployment of the scoped application to the particular server environment, the deployment tool
determines, using the metadata, which of the plurality of application parameters are specific to the particular server environment,
prompts for, or retrieves server-specific values for the unconfigured parameters, and
if server-specific values are available, then configures the messaging and data access configurations with the provided values, or
if server-specific values are not available, then configures the messaging and data access configurations with default values, and
deploys the scoped application, as configured, into the particular server environment without additional server configuration.

7. The computer readable storage medium of claim 6, wherein the parameters include a store, the store indicating a location for persistent data.

8. The computer readable storage medium of claim 6, wherein the parameters include a paging store, the paging store indicating a location for non-persistent data.

9. The computer readable storage medium of claim 6, wherein the parameters include a template for a messaging queue.

10. The computer readable storage medium of claim 6, further comprising instructions stored thereon that when executed by a processor cause the system to store in metadata of the application an entry associated with the parameter, the entry configured to identify the parameter for an administrator.

11. A system for operating a server, the system comprising:
a scoped application stored on a computer readable storage medium, said scoped application configured to be deployed into different server environments, wherein the scoped application includes
a Java messaging service (JMS) consumer and a JMS producer,
a plurality of application modules that execute on a server,
metadata that identifies which of a plurality of application parameters are specific to different server environments,
a messaging configuration that sets the parameters through which each scoped application communicates, wherein the parameters are further configured to assist messaging between the JMS consumer and a second JMS producer in a second application, and wherein the parameters are further configured to assist messaging between the JMS producer and a second JMS consumer in the second application,
a data access configuration that sets the parameters defining types and sources of data that are accessed by the scoped application,
wherein each of the messaging and data access configurations include
preconfigured messaging parameters, as identified by the metadata, which are generic to all of the different server environments, and which govern how the scoped application conducts internal messaging, and
unconfigured messaging parameters, as identified by the metadata, which are specific to each of the different server environments, and which govern how the scoped application conducts messaging between a plurality of applications executing on the server; and
a deployment tool that deploys the scoped application from a computer readable storage medium as an application instance into a particular server environment, wherein during deployment of the scoped application to the particular server environment, the deployment tool
determines, using the metadata, which of the plurality of application parameters are specific to the particular server environment,
prompts for, or retrieves server-specific values for the unconfigured parameters, and
if server-specific values are available, then configures the messaging and data access configurations with the provided values, or
if server-specific values are not available, then configures the messaging and data access configurations with default values, and
deploys the scoped application, as configured, into the particular server environment without additional server configuration.

12. The system of claim 11, wherein the application is further configured to access data from a database using database access configuration information.

13. The system of claim 11, wherein the application further comprises metadata, the metadata further comprising an entry configured to cause the deployment tool to prompt an administrator for the values.

14. The system of claim 11, wherein the application is further configured with messaging configuration information and parameters configured to assist messaging between a messaging system producer and a messaging system consumer.

15. The system of claim 11, wherein the application is created from a combination of modules.

16. The system of claim 11, wherein deployment tool use a deployment descriptor that is associated with the application to provide values for server-specific configurations.

* * * * *